US 6,751,281 B2

(12) United States Patent
Hikida et al.

(10) Patent No.: US 6,751,281 B2
(45) Date of Patent: Jun. 15, 2004

(54) MEASUREMENT SYSTEM OF TORSION VIBRATION FOR REACTOR INTERNAL PUMP

(75) Inventors: Naoto Hikida, Ibaraki (JP); Seiichi Matsumura, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/426,313

(22) Filed: Apr. 30, 2003

(65) Prior Publication Data
US 2004/0013222 A1 Jan. 22, 2004

(30) Foreign Application Priority Data
Jul. 19, 2002 (JP) ......................... 2002-210477

(51) Int. Cl.⁷ .................. G21C 17/00; G21C 15/25
(52) U.S. Cl. .................. 376/372; 376/245; 376/246; 376/260; 376/392; 376/407; 73/650; 73/862.41; 73/862.51
(58) Field of Search ................. 376/245, 246, 376/260, 372, 392, 407

(56) References Cited
U.S. PATENT DOCUMENTS
4,408,294 A * 10/1983 Imam ..................... 702/35
5,206,816 A * 4/1993 Hill et al. ................ 702/56
6,456,945 B1 * 9/2002 Sonnichsen et al. ...... 702/56
2002/0170349 A1 * 11/2002 Soneda et al. ........... 73/168

FOREIGN PATENT DOCUMENTS
JP 07-005056 1/1995

* cited by examiner

Primary Examiner—Michael J. Carone
Assistant Examiner—Jack Keith
(74) Attorney, Agent, or Firm—Hogan & Hartson, LLP

(57) ABSTRACT

Object of this invention is to provide an axial torsional vibration measurement device of the reactor internal pump capable of measuring the axial torsional vibration easily. The vibration detector 2 that detects vibration in the radial direction, and the sound detector 3 that detects vibration in the circumferential direction are fitted on cylindrical motor casing 6, which contains the motor of a reactor internal pump. The dimension of both signals of a vibration waveform signal detected by the vibration detector 2, and a sound waveform signal detected by the sound detector 3 are matched in vibration calculating device 15, to thereby obtain an axial torsion vibration of a motor from the difference of both signals.

4 Claims, 6 Drawing Sheets

2 ··· Vibration detector, 3 ··· Sound detector, 4 ··· Base plate
6 ··· Motor casing, 12 ··· Motor cover 2 ··· Vibration detector, 3 ··· Sound detector, 4 ··· Base plate
6 ··· Motor casing, 12 ··· Motor cover

MEASUREMENT SYSTEM OF TORSION VIBRATION FOR REACTOR INTERNAL PUMP

TECHNICAL FIELD OF THE INVENTION

This invention relates to a measurement system of torsional vibration for Reactor Internal Pump used for controlling Reactor core flux of a boiling water reactor.

BACKGROUND OF THE INVENTION

Reactor Internal Pump is used for controlling Reactor core flux of a Nuclear reactor, in the boiling water reactor. The reactor internal pump is fitted by hanging down on lower part of a reactor pressure vessel. About ten sets of reactor internal pumps are arranged in circle form at the lower part of the reactor pressure vessel. The reactor internal pump is usually driven by an inverter.

The reactor internal pump consists of an impeller that is a hydraulic power part, and a motor (motor rotor and motor stator) that is a drive part. A reactor internal pump is contained in a cylindrical motor casing, and this casing is connected with a reactor pressure vessel through a nozzle, and hung down. The lower end of the motor casing is sealed by a motor cover, to thereby prevent the discharge of reactor water.

Conventionally, such a reactor internal pump has measured vibration, in order to supervise an operation state. Two kinds of vibration are measured by setting a vibration meter in the motor casing. That is, vibration of the motor casing produced by change of a pump axis and the fluid included therein is measured by an electrodynamic vibration meter (vibration detector), and the vibration sound and fluid sound of a pump is measured by piezoelectric vibration meter (sound detector). As for the vibration detector and the sound detector, two pieces are fitted on the circumferential direction of the motor casing at intervals of the angle of 90 degrees, respectively.

Object of the vibration detector is to measure vibration in the radial direction of the motor casing (reactor internal pump), and the object of the sound detector is to check the sound transmitted mainly to the motor casing.

By the way, an axial torsional vibration is generated in the reactor internal pump, due to the torque change of a motor. There is a possibility that the frequency component of the axial torsional vibration generates mechanical resonance with the natural frequency of the composition parts forming the reactor internal pump, and damage the composition parts. Therefore, taking into consideration the influence of repetitive fatigue of a reactor internal pump or the like, it is needed to measure the axial torsional vibration.

Measuring an axial torsional vibration of a motor by change of the phase difference of the detected signal of the optical detector, having the optical detector fitted on two places of the axis of rotation, is known, for example, as disclosed in JP-A-07-5056.

The conventional technology includes the optical detector fitted on the axis of rotation of a motor, to thereby measure the axial torsional vibration. However, both of the pump and the motor are contained in a motor casing, so as to be sealed therein. The reactor internal pump includes no exposed part in the axis of rotation. This makes it very difficult practically for a detector to be fitted. For enabling the detector to be fitted on the axis of rotation, large alteration of the reactor internal pump is needed.

For this reason, development of the technology for allowing an easy measuring system without large alteration of the reactor internal pump is demanded strongly.

SUMMARY OF THE INVENTION

This invention is proposed in order to overcome the above-described problem, and its object is to provide an axial torsional vibration measurement device of the reactor internal pump capable of measuring the axial torsional vibration easily.

In this invention, a vibration detector that detects the vibration in radial directions and a sound detector that detects the vibration in the circumferential direction are fitted on a cylindrical motor casing containing a motor of a reactor internal pump, and the dimensions of both signals of the vibration waveform signal detected by the vibration detector and the sound waveform signal detected by the sound detector are made to be matched, to thereby obtain an axial torsional vibration of a motor from the difference of both signals.

According to this invention, vibration in the circumferential direction is detected in the sound detector, therefore an axial torsion frequency component is contained in a sound waveform signal. An axial torsional vibration can be measured by the difference of the vibration waveform signal containing no axial torsion frequency component. Also conventionally, the vibration detector and the sound detector are formed in the vibration measurement of a reactor internal pump, therefore an axial torsional vibration can be easily measured only by changing the fitting constitution of the sound detector.

If put in another way, in this invention, an axial torsional vibration is obtained by the difference of the vibration waveform signal of the vibration detector that detects the vibration in the radial direction which is substantially the same direction with the circumferential direction detected by the sound detector, in similar way to the detection of the vibration in the circumferential direction by the sound detector.

In preferred embodiment of this invention, the vibration detector is disposed in a different position from the sound detector by 90 degrees in the circumferential direction.

PREFERRED EMBODIMENT OF THE INVENTION

Figure 1:
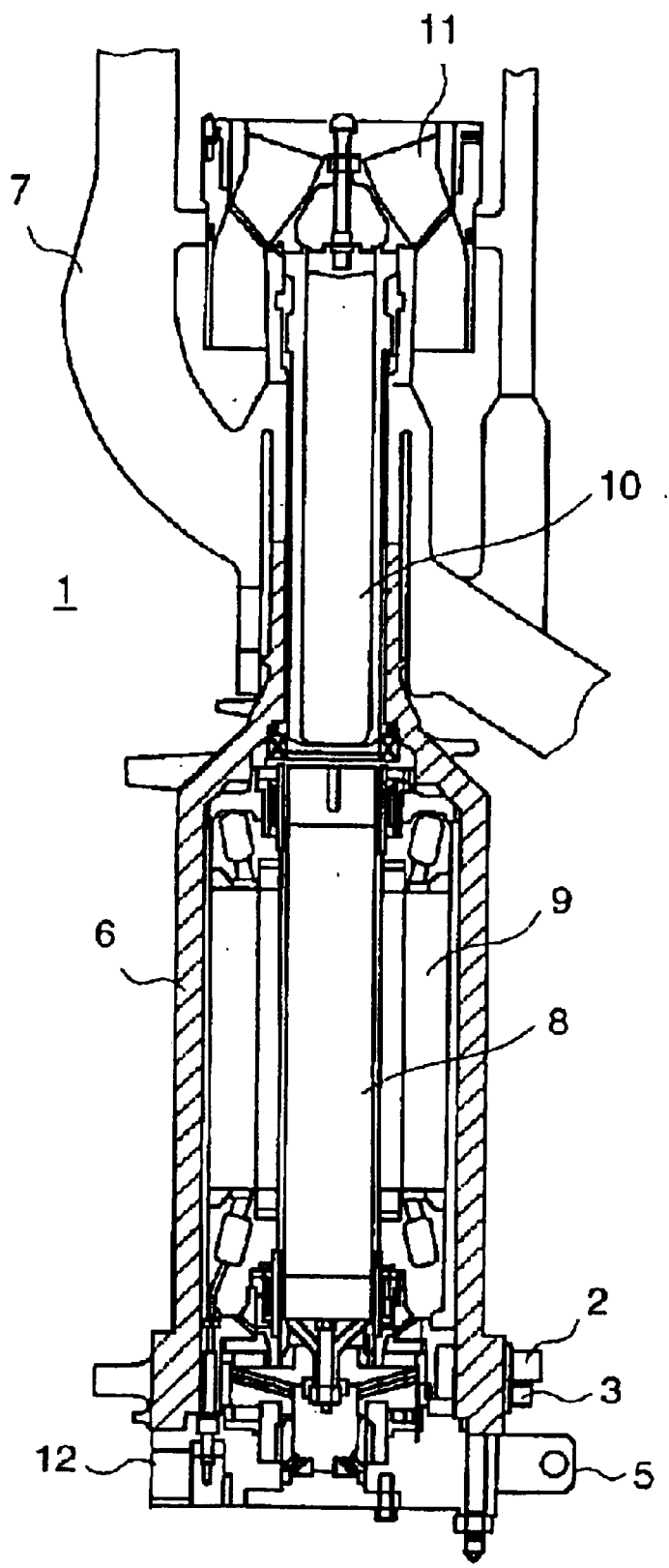
FIG. 1 is a substantially partially broken block diagram of a reactor internal pump.
Figure 2:
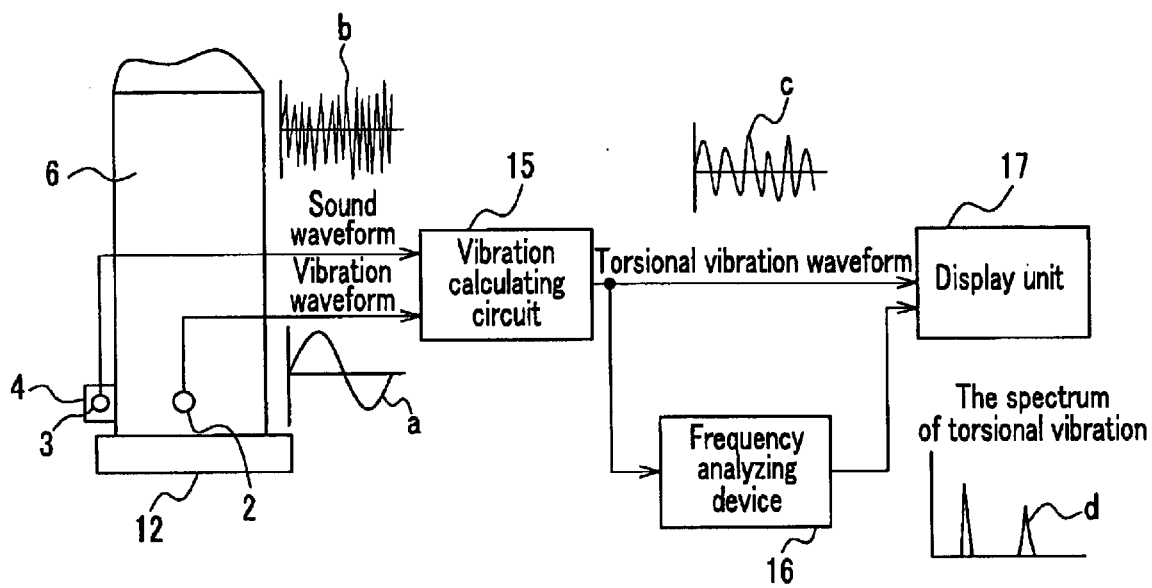
FIG. 2 is a block diagram showing one embodiment of this invention.

Preferred embodiment of this invention will be shown in FIG. 1 and FIG. 2.

In FIG. 1, the reactor internal pump 1 is formed with motor stator 9 which serves as stationary portion in such a way that motor rotor 8 is connected with impeller 11 which serves as hydraulic power portion by axis of rotation 10, and fixed by hanging down to the lower part of a reactor pressure vessel 7.

Cylindrical motor casing 6 that contains the rotor 8 of the motor and the stator 9 is connected with the reactor pressure vessel 7 through a nozzle part by hanging down. Lower end of the motor casing 6 is sealed by cover 1, in order to prevent discharge of reactor water.

Figure 3:
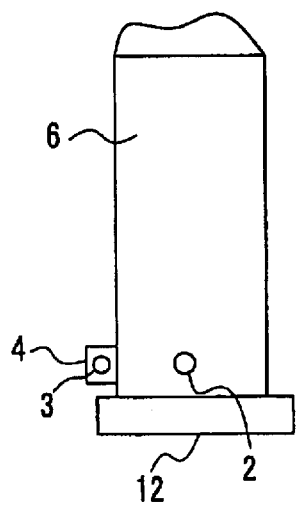
FIG. 3 is an explanatory view of a fitting state of a sound detector and a vibration detector according to this invention.
Figure 4:
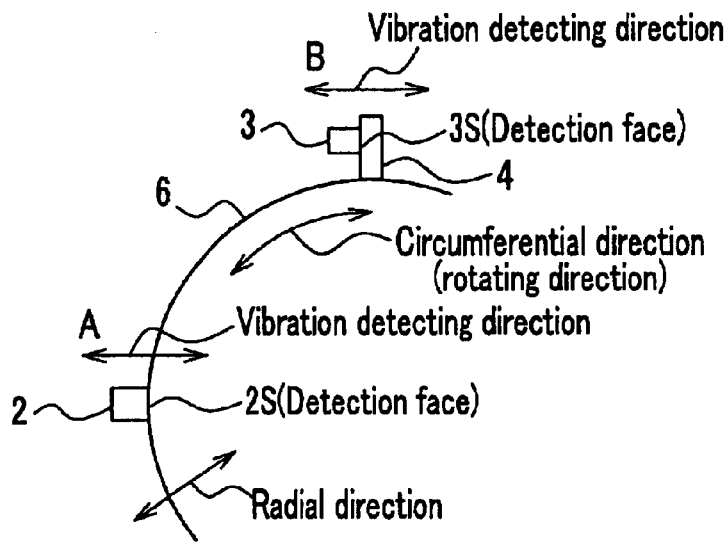
FIG. 4 is an explanatory view of a fitting state of a sound detector and a vibration detector according to this invention.

The vibration detector 2 and the sound detector 3 are fitted on the lower part position of the cylindrical casing 6. The vibration detector 2 is fitted on the outer circumference of the motor casing 6 so as to be contacted therewith as shown in FIG. 3 and FIG. 4. The vibration detector 2 detects vibration of the vibration detecting direction (the radial direction of casing 6) shown by arrow A.

On the other hand, the sound detector 3 is fitted on the base plate 4 which is formed perpendicularly projecting from the outer circumference, differently disposed from the vibration detector 2 by 90 degrees in the circumferential direction of the cylindrical motor casing 6. The sound detector 3 is fitted on the base plate 4 so that its detection face 3S is contacted with the base plate 4, to thereby detect the vibration in the vibration detecting direction (in the circumferential direction of the casing 6) shown by arrow B. The circumferential direction of the motor casing 6 becomes the rotating direction of motor rotor 8 (axis of rotation 10).

The conventionally used electrodynamic vibration meter (electrodynamic speedometer) is used as vibration detector 2. Also, The conventionally used piezo-electric vibration meter (piezo-electric accelerometer) is used as sound detector 3. The sound detector 3 is distinguished from the conventional one in detecting vibration in the circumferential direction.

One embodiment of the measuring system that measures an axial torsional vibration by the detected signal of the vibration detector 2 and the sound detector 3 arranged as described above is shown in FIG. 2.

Figure 5:
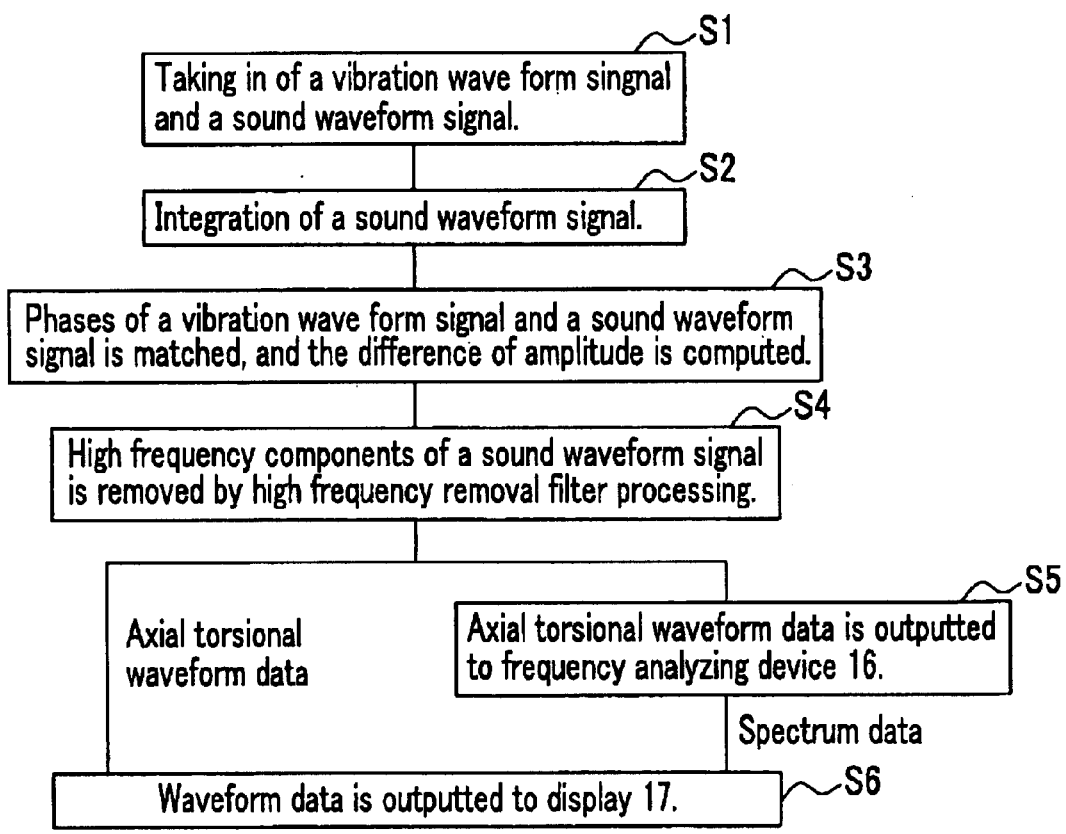
FIG. 5 is a flow chart showing the operation of this invention.

In FIG. 2, vibration waveform signal "a" detected by the vibration detector 2 and sound waveform signal "b" detected by the sound detector 3 are inputted into the vibration calculating device 15. The vibration calculating device 15 consists of computers or the like, and measures an axial torsional vibration based on the vibration waveform signal "a" and the sound waveform signal "b" as follows. The processing will be explained with reference to the flow chart shown in FIG. 5.

Figure 6:
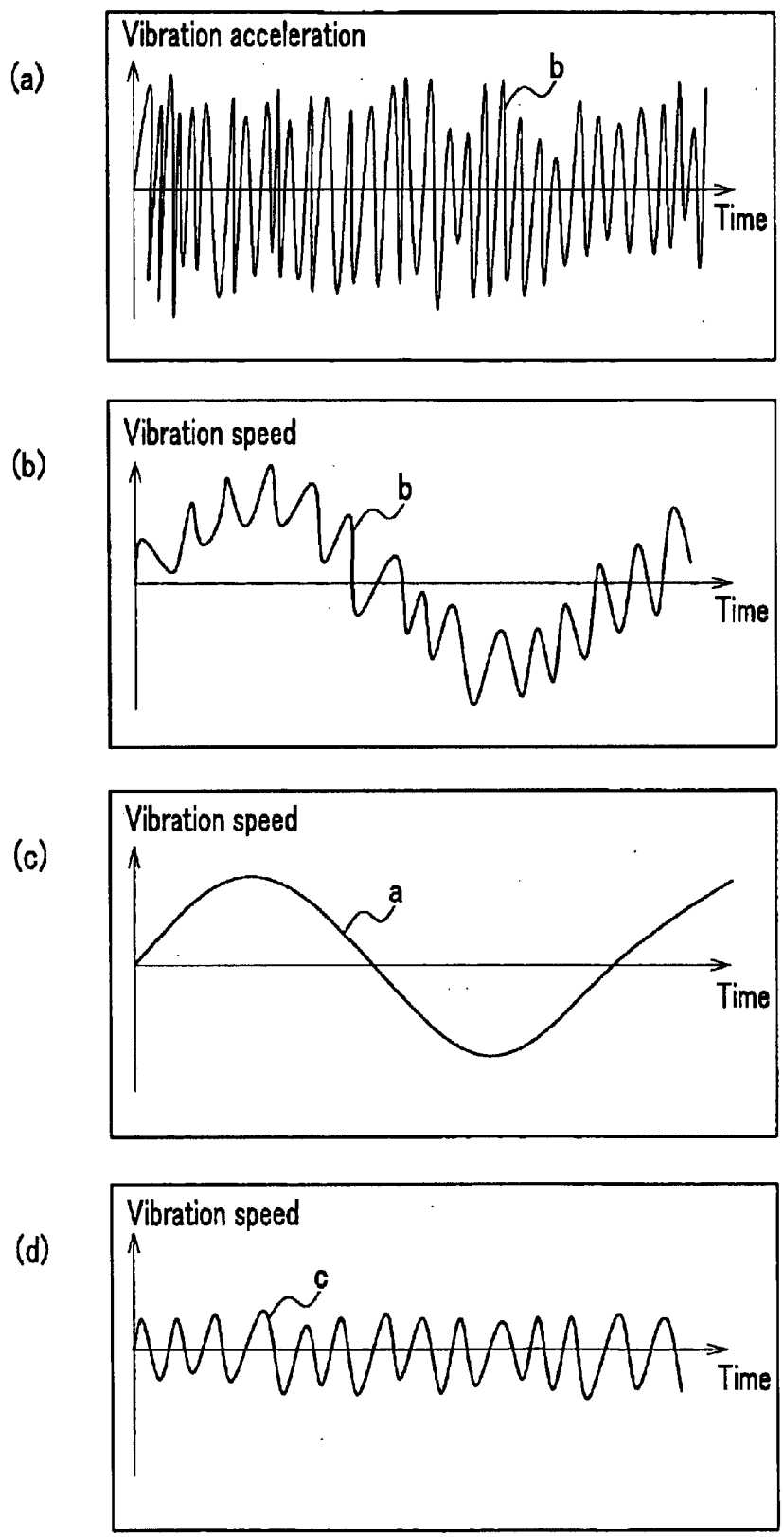
FIG. 6 is a waveform chart explaining this invention.

The vibration calculating device 15 performs taking-in processing of the vibration waveform signal "a" and the sound waveform signal "b" outputted from the vibration detector 2 and the sound detector 3 in Step S1. The vibration waveform signal "a" becomes a waveform as shown in FIG. 6c, and the sound waveform signal "b" becomes a waveform as shown in FIG. 6a. The sound waveform signal "b" outputted from the sound detector 3 (waveform data) serves as vibration acceleration, and the vibration waveform signal "a" outputted from the vibration detector 2 (waveform data) serves as vibration speed.

By numerical integration of the waveform data "b" of the sound detector 3, the amount of physics is changed into vibration speed, and the waveform data "a" and the dimension of the vibration detector 2 are made to be matched in Step S2. The sound waveform signal "b" obtained by integrating the waveform data "b" of the sound detector 3 is shown in FIG. 6b.

Proceeding from Step S2 to Step S3, the phases of the sound waveform signal "b" of FIG. 6b and the vibration waveform signal "a" are made to be matched, and the difference of the amplitude of both signals is computed. The vibration waveform signal "a" of the vibration detector 2 is frequency distribution in the radial direction of the motor casing 6, and vibration (axial torsional vibration) in the circumferential direction of the motor casing 6, i.e., vibration in the rotating direction of rotor 8, is detectable according to the difference of the amplitude of both signals. The waveform of the detected axial torsional vibration signal "c" is shown in FIG. 6d.

In Step S4, an axial torsional vibration that generally influences the structural integrity of apparatus is low frequency components (about 1 to 700 Hz). Then high frequency filter processing of the axial torsional vibration signal "c" of FIG. 6d is performed, to remove high frequency components, such as sound. In Step S5, the detected axial torsional vibration signal (axial torsional waveform data) c is outputted to frequency analyzing device 16, and the axial torsional vibration signal "c" is outputted and shown in display unit 17 in Step S6. The spectrum data "d" obtained by the frequency analyzing device 16 as shown in FIG. 7 is displayed on the display unit 17.

Figure 7:
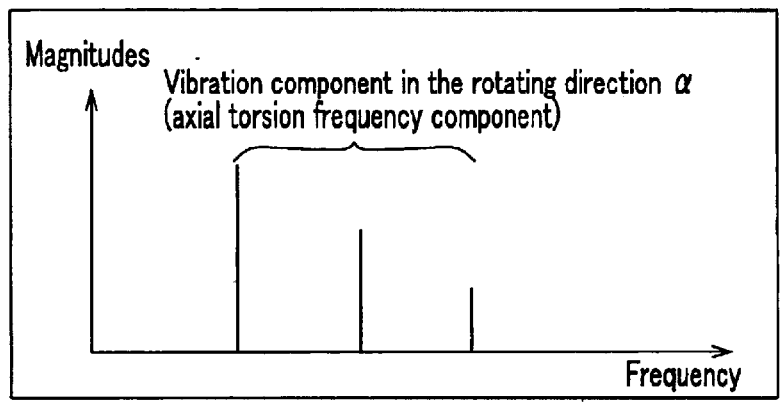
FIG. 7 is a waveform chart explaining this invention.

Thus, the spectrum data "d" of the axial torsional vibration signal "c" shown in the axial torsional vibration signal "c" shown in FIG. 6d and FIG. 7 is displayed on the display unit 17. A surveillance member can know the operation state of the reactor internal pump 1 visually by the display unit 17.

In addition, the display unit 17 is an example of visualization unit. However other visualization unit, such as printing unit can also be used.

Thus, an axial torsional vibration of the reactor internal pump 1 is measured. However, since vibration in the circumferential direction is detected in the sound detector, the axial torsion frequency components are contained in the sound waveform signal and the axial torsional vibration can be measured according to the difference of the vibration waveform signal containing no axial torsion frequency components. Also conventionally, the vibration detector and the sound detector are formed in vibration measurement of a reactor internal pump. Therefore, the axial torsional vibration can be easily measured only by changing the fitting constitution of the sound detector.

Moreover, since the spectrum data of the axial torsional vibration is displayed, it can be judged whether vibration factor is due to the power supply of an inverter or rotation of a motor.

In addition, in order to make the dimensions of the detected vibration signal of the vibration detector, and the detected sound signal of the sound detector be matched, the detected sound signal is integrated. However, it is easily understood that the detected vibration signal may be differentiated and changed into vibration acceleration from vibration speed. Other embodiments of this invention will be shown in FIG. 8.

Figure 8:
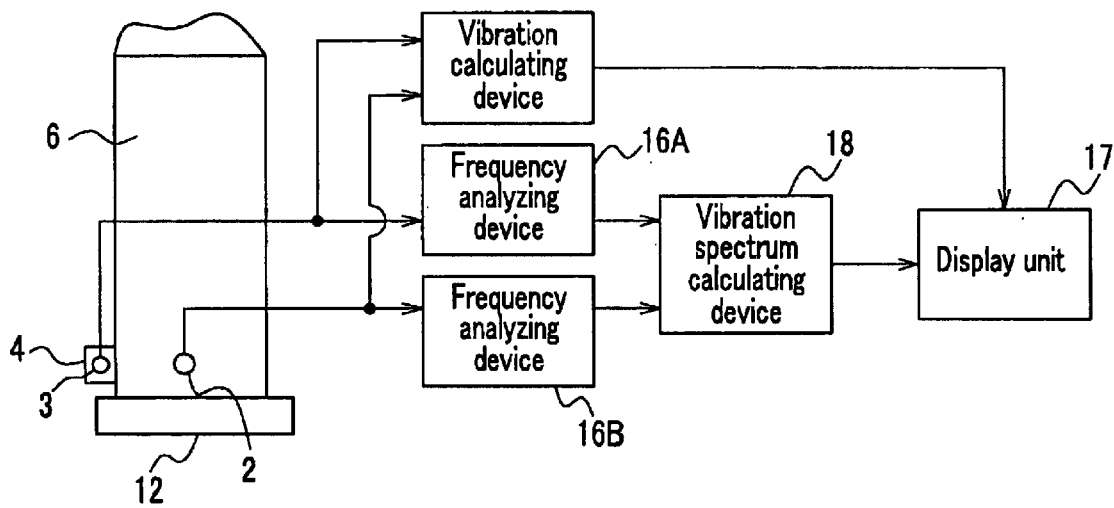
FIG. 8 is a block diagram showing other embodiments of this invention.

The embodiment shown in FIG. 8 differs from the embodiment shown in FIG. 2 in that the detected vibration signal of the vibration detector 2 and the detected sound signal of the sound detector 3 are inputted into the frequency analyzing devices 16A and 16B, respectively, to obtain a sound spectrum and a vibration spectrum, and after making the dimensions matched by the vibration spectrum calculating device 18, the spectrum of the axial torsional vibration is calculated according to the difference of both spectra.

Thus, the axial torsional vibration can be measured similarly to the embodiment of FIG. 2. Moreover, when each wave-like frequency component is compared and specify a unique frequency component only in the sound wave form, it will serve as an axial torsional vibration. Therefore, judgment about generating of an axial torsional vibration can be simple.

Figure 9:
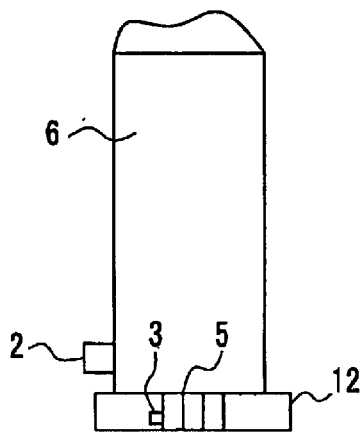
FIG. 9 is a front view showing other examples of a fitting state of the sound detector in this invention.
Figure 10:
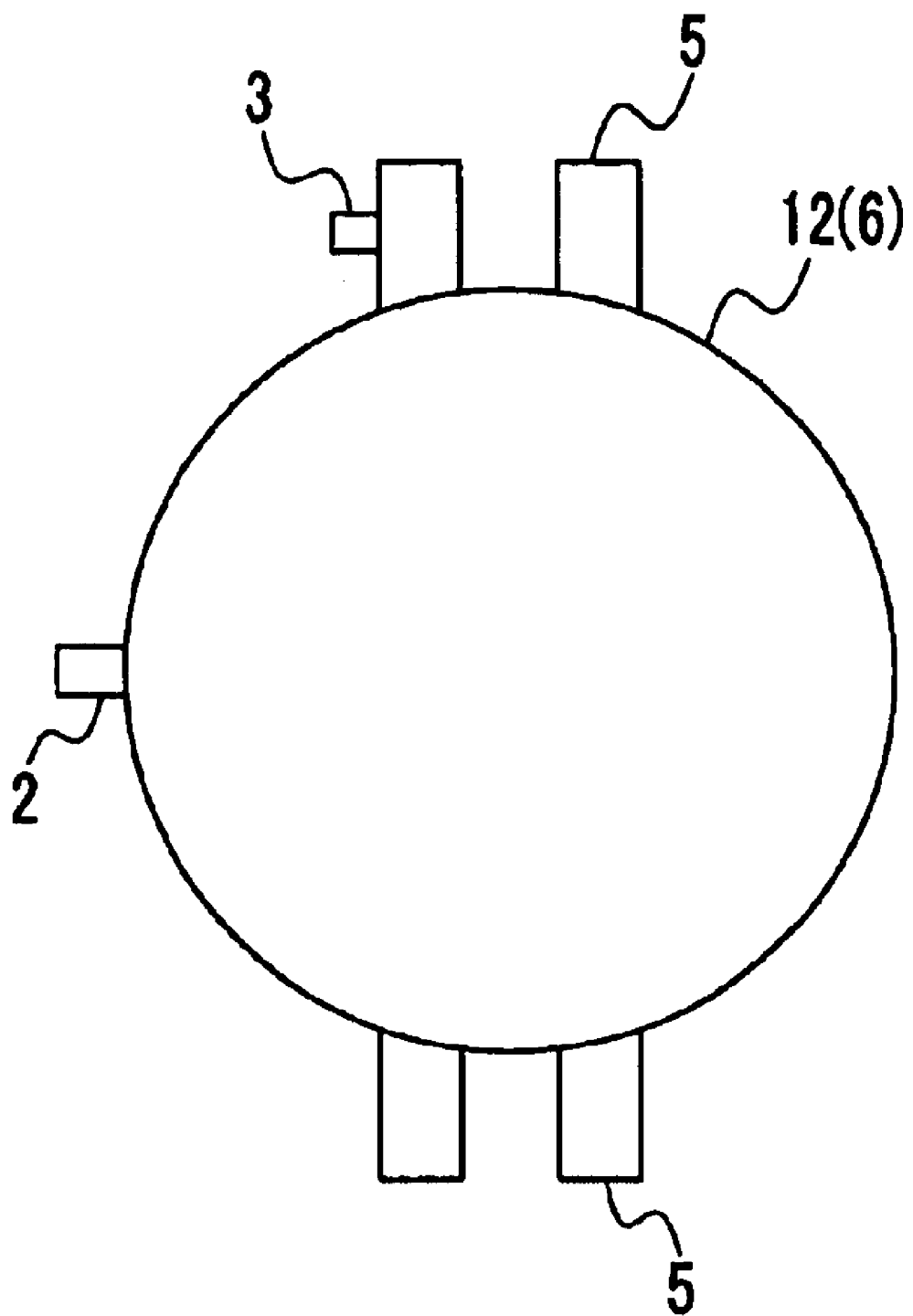
FIG. 10 is a plan view of FIG. 9.

Next, the sound detector 3 is fitted on the base plate 4, however as shown in FIG. 9 and FIG. 10, the sound detector 3 can also be fitted on the side face of lug 5 currently fixed to the motor cover 12. The lug 5 is used at the time of maintenance check of the reactor internal pump 1, and four lugs 5 are attached in the perpendicular direction of the outer circumference of the cover 12. The vibration detector 3 is fitted on the position shifted 90 degrees in the circumferential direction against the lug 5.

Thus, the axial torsional vibration can be measured, and it becomes unnecessary to form auxiliary base plate 4 for the sound detector 3 to be fitted.

An axial torsional vibration of a reactor internal pump is measured as described above. However the axial torsional vibration is measured according to the difference of the vibration waveform signal that contains no axial torsion frequency components by detecting the vibration in the circumferential direction by the sound detector. Therefore the vibration detector and the sound detector can measure an axial torsional vibration easily, which is conventionally formed in vibration measurement of a reactor internal pump, by only changing the fitting constitution of the sound detector.

Moreover, since the spectrum data of the axial torsional vibration is displayed, it can be judged whether vibration factor is due to the power supply of an inverter or rotation of a motor.

In addition, the vibration detector and the sound detector are formed in a position shifted by only 90 degrees in the circumferential direction of the motor casing in the above-described embodiment. However, the axial torsional vibration can also be obtained by the difference of the frequency components in the radial direction which is substantially the same direction with the circumferential direction detected by the sound detector in the radial vibration direction detected by the vibration detector, when set at an arbitrary angle.

In this invention, an axial torsional vibration is measured by detecting the vibration in the circumferential direction and by obtaining the difference of the vibration waveform signal that contains no axial torsion frequency components in a sound detector. Therefore, the vibration detector and the sound detector, which are conventionally formed in vibration measurement of a reactor internal pump, can measure an axial torsional vibration easily only by changing the fitting constitution of the sound detector.

What is claimed is:

1. A measurement system of torsion vibration for Reactor Internal Pump, including:
    a reactor internal pump that has a motor contained in a cylindrical motor casing;
    a vibration detector fitted on said cylindrical motor casing that detects vibration in radial directions;
    a sound detector fitted on said cylindrical motor casing that detects the vibration in the circumferential direction;
    a vibration calculating unit that receives the vibration waveform signal detected by said vibration detector, and the sound waveform signal detected by said sound detector, said vibration calculating unit calculating the difference in amplitude of said vibration signal and said sound signal thereby obtaining an axial torsional vibration signal of said motor; and
    a visualization device that visualizes said axial torsional vibration obtained by said vibration calculating unit.

2. A measurement system of torsional vibration for Reactor Internal Pump as described in claim 1, wherein a reactor core flow rate of a reactor is controlled by said internal pump.

3. A measurement system of torsional vibration for Reactor Internal Pump as described in claim 1, wherein said vibration detector is fitted on outer circumference of said cylindrical motor casing and said sound detector is fitted on a base plate which is projected from the outer circumference of said cylindrical motor casing in a position different from said vibration detector by 90 degrees.

4. A measurement system of torsional vibration for Reactor Internal Pump as described in claim 1, wherein said vibration detector is an electrodynamic vibration meter, and said sound detector is a piezo-electric vibration meter.

* * * * *